United States Patent [19]

Connor

[11] Patent Number: 4,740,028

[45] Date of Patent: Apr. 26, 1988

[54] SUNVISOR FOR A MOTOR VEHICLE

[75] Inventor: John Connor, Ashorne, England

[73] Assignee: Incoils Ltd., Warwickshire, England

[21] Appl. No.: 937,062

[22] PCT Filed: Mar. 3, 1986

[86] PCT No.: PCT/GB86/00111

§ 371 Date: Nov. 5, 1986

§ 102(e) Date: Nov. 5, 1986

[87] PCT Pub. No.: WO86/05146

PCT Pub. Date: Sep. 12, 1986

[30] Foreign Application Priority Data

Mar. 7, 1985 [GB] United Kingdom ............... 8505895

[51] Int. Cl.$^4$ ............................................. B60J 3/02
[52] U.S. Cl. .............................. 296/97 H; 296/97 K; 362/142
[58] Field of Search ................... 296/97 H, 97 K; 362/142

[56] References Cited

U.S. PATENT DOCUMENTS

| | | | |
|---|---|---|---|
| 4,390,202 | 6/1983 | Flowerday et al. | 296/97 K |
| 4,421,355 | 12/1983 | Marcus | 296/97 H |
| 4,486,819 | 12/1984 | Marcus et al. | 362/142 |
| 4,541,663 | 9/1985 | Schwantz et al. | 296/97 H |

FOREIGN PATENT DOCUMENTS

| | | |
|---|---|---|
| 96154 | 12/1983 | European Pat. Off. . |
| 157919 | 10/1985 | European Pat. Off. . |
| 3342897 | 5/1985 | Fed. Rep. of Germany . |
| 2046198 | 11/1980 | United Kingdom . |
| 1581897 | 12/1980 | United Kingdom . |

Primary Examiner—Robert R. Song
Attorney, Agent, or Firm—Parkhurst & Oliff

[57] ABSTRACT

Sunvisors provided with vanity mirrors usually have the mirror, with or without illumination, fixed to the upper surface of the visor when in the stowed position, and to avoid undesirable reflections a cover is sometimes provided. Also, various switches are provided to control energization of the lighting means when present. The invention simplifies this kind of visor by arranging that the mirror is carried by a hinge (7b) near the lower margins of the visor to open out therefrom downwardly from a stowed position facing into a recess (11) in the upper surface of the visor. The lower edge of the visor may be relieved as at (12) to maximize the hingeing angle of the mirror so as to achieve compactness while satisfying visor safety requirements. The wire frame (7) of the visor may be joggled inwards at (7a) and (8a) to provide hinge pins and electrical connections (7b) and (8b) for the visor.

5 Claims, 2 Drawing Sheets

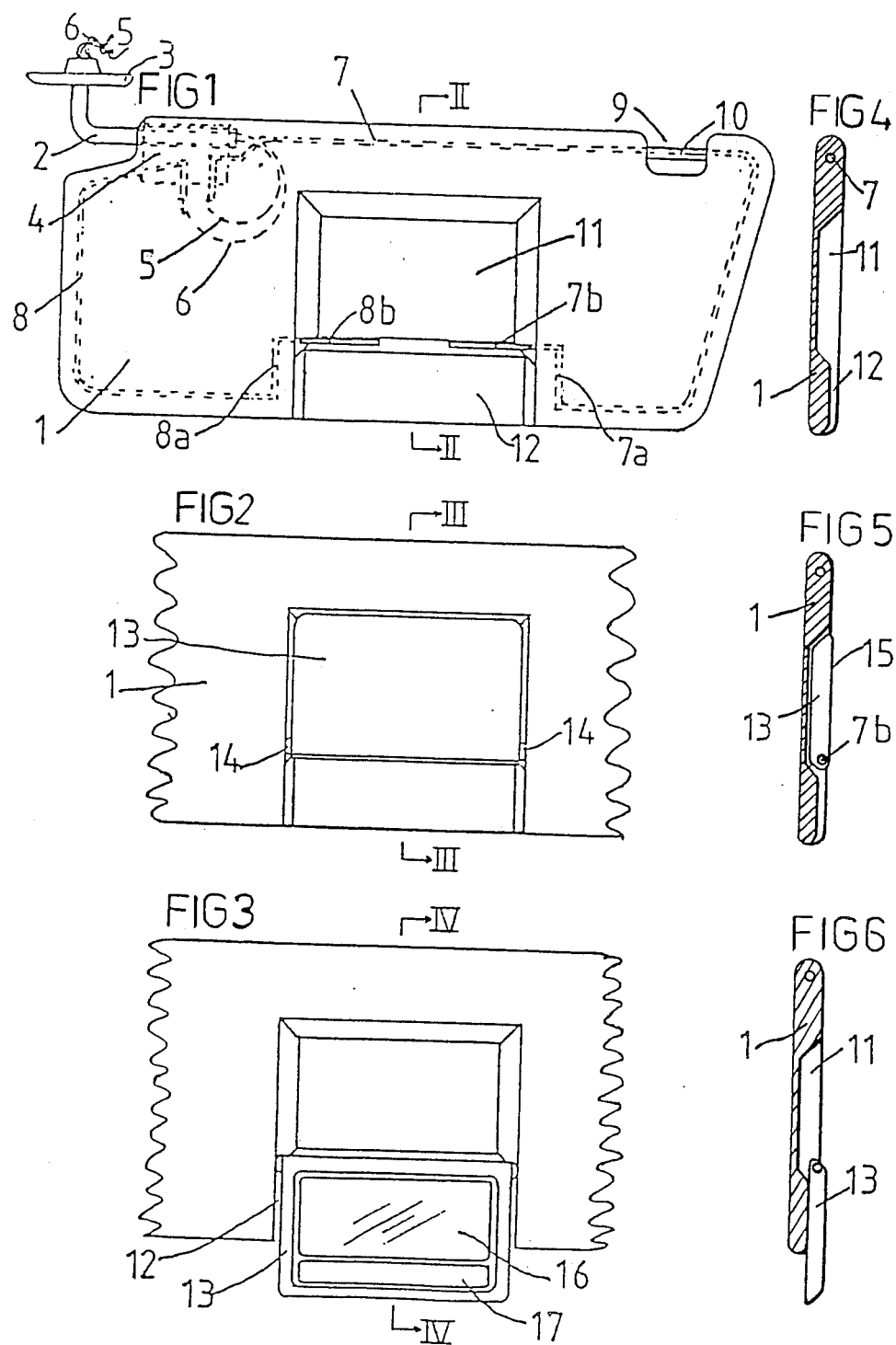

SUNVISOR FOR A MOTOR VEHICLE

The invention relates to a sun visor for a motor vehicle and is especially concerned with such a visor which has provision for a vanity or make-up mirror. Such vanity mirrors are commonly secured by adhesive to the surface of the visor so as to be usable when the visor is lowered. However there is a requirement for means for covering up the mirror when the visor is in use as a shield against the sun so as to avoid unwanted reflections and this is also the case where the mirror is provided with means for illuminating the face of the user (called hereinafter an "illuminated mirror") so as to cover not only the mirror but the illuminating means and such requirements have been met in the past by the provision of a hinged cover for covering the mirror and its illuminating means when not in use. Various more or less complex switching arrangements have also been proposed for ensuring that when an illuminating means is provided it is not energized when the visor is in its stowed position.

The invention aims to provide a visor in which all or any of these requirements can be met in a simple and effective manner.

According to the invention a visor comprises an enlongated body with hinging means along a first of its long edges to swing between an approximately horizontal stowed position and an approximately vertical maximum use position or somewhat further, a vanity mirror hinged near the second of the long edges to swing between a stowed position against a surface of the visor and a user position in which it is swung outwardly from the stowed position. Usually this outward swinging movement will be about 180° but for ease of construction and to some extent to meet safety regulations it may be rather less, say 150° to 160°, to permit the hinge of the mirror to be recessed within the body of the visor. This limitation of angular movement can usually be tolerated since with modern vehicle design the windshield usually slopes forward from the top so that the visor itself can be rotated to occupy a position beyond the vertical so as to bring the mirror when is use to a suitable angle in relation to the user. In some cases the visor's surface can be relieved along its lower margin in the region occupied by the mirror so as to permit a greater angular movement than would be otherwise possible.

The mirror is preferably fully housed within the visor body when in the stowed position.

An advantage of the arrangement according to the invention is that when the vanity mirror is in use it is lower than would be the case if it were rigidly secured to the visor as has previously been the case so that it is in a more natural position for use. If the mirror is illuminated its auxilliary use as a map reading light is also improved. In one form of the invention the mirror or the visor is provided with means for illuminating the face of the user. This may take the form of a lamp and diffuser located within a mirror unit or adjacent the mirror in the visor itself. In the latter case the illuminating means may be covered by an extension of the mirror unit and in either case the lamp may be switched on and off automatically as a result of the hinging movement of the mirror.

A feature of the invention is the provision of a wire frame either moulded in or recessed in the case of a prefabricated foam body, the wire frame being joggled inwards along part of the second long edge of the visor and serving as an inboard hinge-pin for the mirror. The wire frame may be arranged in two separate parts and used to lead current to a lamp within a mirror unit which provides illumination for the face of the user.

The above and other features of the invention will appear from the following description of one form thereof with reference to the accompanying drawings in which:

FIGS. 1 and 4 are respectively an elevation of a visor in its maximum use position without its mirror, and a section on the line II—II, FIGS. 2 and 5 are respectively an elevation of the mirror part of the visor of FIG. 1 showing a mirror fitted and housed, and a section on the line III—III, FIGS. 3 and 6 are respectively an elevation similar to FIG. 2 but with the mirror in a user position, and a section on the line IV—IV, FIG. 7 is a detail showing a section of part of the wire frame forming a hinge-pin for a mirror unit and machined away to form a switch, FIG. 8 is a section of a spring contact used in conjunction with the pin of FIG. 7 to form a switch which is shown in the "off" position.

Figure 7:
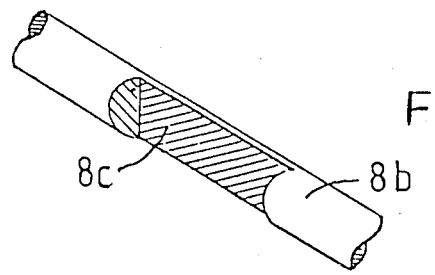

In FIG. 1 there is shown a visor 1 which is hinged along its top margin on a tubular bracket 2, which is secured in an escutcheon plate 3 intended to be secured to the roof of a motor vehicle above the windshield. The visor 1 comprises in this case a moulded foam body containing in the region which is to be attached to the brakcet 2 a rigid moulding 4 keyed to the foam moulding and having a suitable door to fit over the end of the bracket 2. Suitable retaining clips and friction devices may be included at this point but are not shown since they are conventional. A pair of conductors 5 and 6 enter through the hollow centre of the escutcheon plate 3 and pass through the bracket 2 to emerge within the moulding of the visor 1 where they are shown in chain lines. They are connected to the respective ends of a two-part frame also shown in chain lines at 7 and 8 which extend around the periphery of the visor 1. The ends of these frame members are embedded in the moulding 4 for rigidity and the member 7 passes through a cut out 9 where it is covered by a sleeve 10 of plastic material thus providing a portion which may be clipped to the roof of the vehicle with a suitable clip.

The frame members 7 and 8 extend around the ends of the visor 1 and along the lower margin thereof where they are joggled inwards as shown at 7a and 8a to provide a pair of suitably positioned hinge-pins 7b and 8b which project inwardly towards each other in a recess 11 which is let into the rearwardly facing portion of the visor as seen in its use position. The edges of the recess 11 are chamfered as shown so as to facilitate a skinning operation which may be required to provide a surface for the visor which matches the interior of the vehicle.

In order to comply with safety regulations a certain minimum radius has to be provided on all exposed edges and therefore the recess 11 can not be extended at its full depth to the lower edge of the visor. A shallower recess 12 is therefore provided between the recess 11 and the edge of the visor so as to provide a space into which the mirror referred to later can be accommodated when in its user position. The configuration of the recess will be clear from FIG. 4.

FIGS. 2 and 5 show a portion of the visor 1 of FIG. 1 with a mirror unit 13 hinged on the hinge-pins 7b and 8b and this unit being provided with small bosses 14 on the hinge line so as to space it evenly within the recess 11. The mirror 13 in this position has its reflecting surface facing inwards into the recess 11 so that only an opaque face 15 is visible.

FIGS. 3 and 6 show a similar view to FIGS. 2 and 5 but in this case the mirror is in its user position where it is folded out from the recess 11 so as to lie partly within the recess 12. In this position it lies at 180° with respect to the original stowed position shown in FIGS. 2 and 5 so that the reflecting surface 16 is towards the user and, if the mirror is of the illuminated kind, with a diffuser 17 or an internal lamp also facing the user.

It will be seen that the inward joggling 7a and 8a of the medial portion of the lower edge of the wire frame permits its use also as a hinge element for a mirror unit at an appropriate position in the visor having regard to safety requirements and aesthetic appearance and results in a particularly economical construction which nevertheless satisfies varying requirements such as the provision of an illuminated or non-illuminated mirror, a stowed position in which the mirror is completely covered without the use of a separate cover plate and in the case of an illuminated mirror reduces the need for electrical switching to a minimum.

Figure 8:
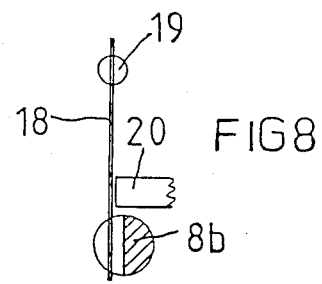
Figure 9:
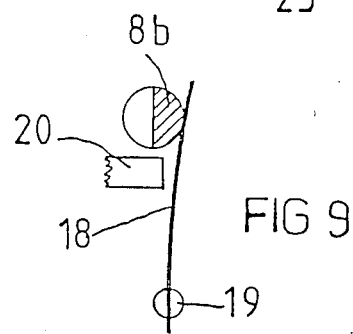
FIG. 9 is a similar view with the switch shown in the "on" position.

In the event that an illuminated mirror is required a lamp or lamps can be provided within the mirror unit in the usual way and can be energized through the hinge-pins 7b and 8b. These hinge-pins can also serve as part of a switch and one means of doing this is shown in FIGS. 7, 8 and 9 where it will be seen that the hinge-pin 8b has a cut out portion 8c where material is removed to the extent of about half its diameter as shown in FIG. 8. The mirror unit has a springy metal blade 18 which is held in a slot in a standard 19, formed as part of a plastic moulding of the mirror unit and is biased against a stop 20 also forming part of the mirror unit, in this position the blade 18 is held clear of contact with the pin 8b. When, however, the mirror is rotated out of the stowed position the parts take up the position shown in FIG. 9 where the blade 18 is then pressed into contact with the back of the hinge-pin 8b and so picks up current from the supply fed into the visor by the conductor 6. The other end of the blade 18 is in contact with one terminal of a lamp (not shown), the other terminal of which is connected to a similar blade which makes contact with the other hinge-pin 7b. A separate manual switch may be provided if desired but generally will not be considered necessary nor is there any need for a separate safety switch since the likelihood of the illuminated mirror unit becoming overheated when it is not stowed within the recess 11, even if it is left on in the user position with the visor stowed against the roof of the vehicle, is very remote and can certainly be designed against.

The provision of the recess 12 can serve, in addition to partly accommodating the mirror unit 11, as a finger hold for initiating downward movement of the visor from its stowed position against the roof of the vehicle.

Figure 10:
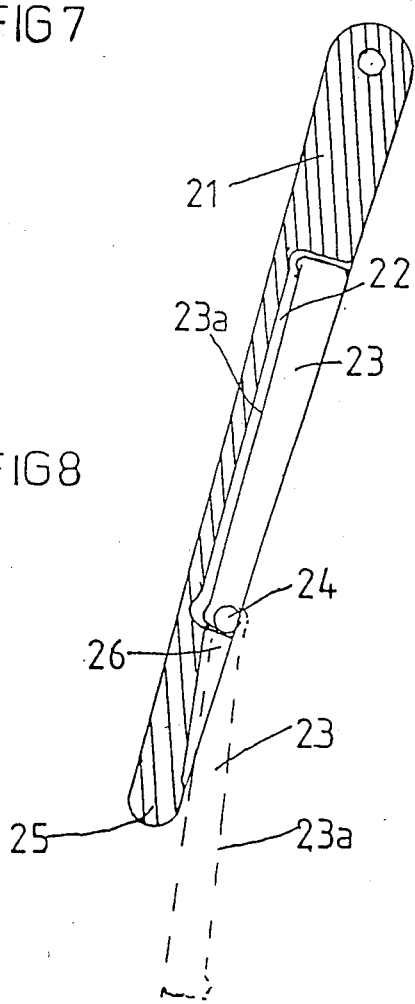
FIG. 10 is a section similar to FIG. 6 showing the invention applied to a visor of tapered configuration.

A further form of the invention is shown in FIG. 10 where the visor is of tapered construction which is desirable in certain vehicles in order to maximise the normal vision through the windshield when headroom is restricted. In this case a visor 21 has a recess 22 which if of maximum dimensions is necessarily tapered as shown. A mirror unit 23 which is also tapered is arranged on a hinge-pin 24 as in the previous construction and has its reflecting surface 23A facing inwards towards the inner face of the recess. Since the free edge of the mirror unit 23 is in the thickest part of the visor, space can be provided at this region for one or more lamps in the case of an illuminated mirror and in order to achieve maximum rotation of the mirror when swung from its stowed position as shown in full lines to the user position shown in chain lines a cut out portion 26 is provided which stops short of the rear edge 25 of the visor which in this instance can not be reduced below the diameter shown on account of safety regulations.

Nevertheless, since the visor can be rotated at least to the position shown the reflective surface 23A can be brought to a satisfactory position for use by a passenger.

I claim:

1. A sun visor for a vehicle comprising an elongated body with hinging means along a first of its long edges to swing between an at least approximately horizontal stowed position and an approximately maximum-use position and, a vanity mirror being arranged in a housing hinged near the second of the long edges with its hinge line approximately parallel thereto to swing between a stowed position against a surface of the visor recessed below the general surface level of the visor, with the reflecting surface towards the visor and a user position in which it is swung outwardly from the stowed position; wherein a wire frame of the visor is joggled inwards along the second long edge to provide one of the elements of the hinge for the mirror housing.

2. A sun visor for a vehicle comprising an elongated body with a wire frame, having hinging means along a first of its long edges to swing between an at least approximately horizontal stowed position and an approximately maximum-use position and, a vanity mirror being arranged in a housing hinged near the second of the long edges with its hinge line approximately parallel thereto to swing between a stowed position against a surface of the visor recessed below the general surface level of the visor, with the reflecting surface towards the visor and a user position in which it is swung outwardly from the stowed position, wherein the wire frame is discontinuous so as to present two wire ends which form both the hinge pins for the mirror housing and serve as electrical conductors for the power supply of a lamp within said housing.

3. A visor according to claim 1, wherein the joggled portion of the frame is discontinuous so as to present two wire ends which form both the hinge pins for the mirror housing and serve as electrical conductors for the power supply of a lamp within said housing.

4. A visor according to claim 2, wherein the wire forming the hinge pin has a relieved portion where a conductor biassed towards it is held out of contact by an insulating member when the mirror is in the stowed position but makes contact when the mirror housing is swung through an angle to move it into the user position.

5. A visor according to claim 3, wherein the wire forming the hinge pin has a relieved portion where a conductor biassed towards it is held out of contact by an insulating member when the mirror is in the stowed position but makes contact when the mirror housing is swung through an angle to move it into the user position.

* * * * *